Figure 1:
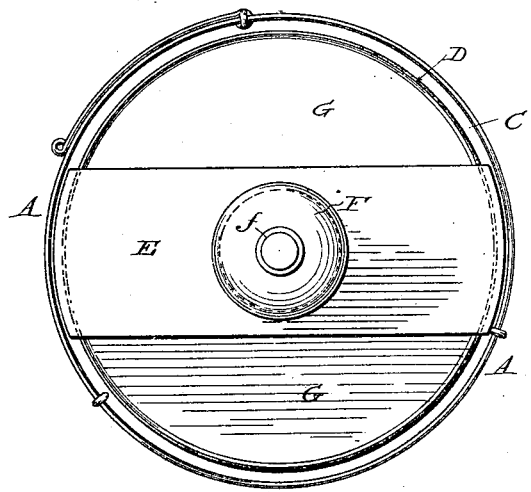

No. 680,384. Patented Aug. 13, 1901.
C. T. KINGZETT.
PROCESS OF FUMIGATING AND DISINFECTING.
(Application filed Dec. 26, 1900.)
(No Model.)

Witnesses
Inventor
Charles T. Kingzett,
by his attorneys

UNITED STATES PATENT OFFICE.

CHARLES THOMAS KINGZETT, OF CHISELHURST, ENGLAND.

PROCESS OF FUMIGATING AND DISINFECTING.

SPECIFICATION forming part of Letters Patent No. 680,384, dated August 13, 1901.

Application filed December 26, 1900. Serial No. 41,147. (No specimens.)

*To all whom it may concern:*

Be it known that I, CHARLES THOMAS KINGZETT, a subject of the Queen of Great Britain, residing at Elmstead Knoll, Chiselhurst, county of Kent, England, have invented an Improved Process of Fumigating and Disinfecting, of which the following is a specification.

In practicing this invention a mass of absorbent material is employed, such as a cast block of plaster-of-paris, or a mass in suitable form of kieselguhr, asbestos, or common sand. When using plaster-of-paris, which I prefer, it is, as stated, formed into a solid block, or when I use other materials, such as those mentioned, the material may be loosely assembled. In all cases the material should be sufficiently refractory to withstand the temperature to which, as hereinafter described, it is submitted. The solid block of plaster-of-paris or the mass of other material may be saturated with a disinfectant solution—as, for instance, a solution of formic aldehyde or of liquid carbolic acid or "sanitas oil" may be used. Instead of saturating the block or mass with the solution of the disinfectant to be employed, I may incorporate into the block or mass a disinfectant in the form of a comminuted solid, which may be, for instance, corrosive sublimate or paraformaldehyde. Upon the block or mass containing, as described, the disinfecting or fumigating element or material I deliver in small regulated quantity a liquid, which may be water or which may be formic-aldehyde solution or a solution of corrosive sublimate or carbolic acid or other desired or suitable solution. The block or mass containing or having incorporated into it in either of the ways described the fumigating or disinfecting material and having delivered upon its surface the liquid or solution is at the same time subjected to heat, whereby the disinfecting or fumigating material is vaporized and at the same time aqueous vapor produced, which, combining with the disinfecting-vapor, increases the volume of the vapors and acts as a carrier which assists in the efficient distribution of the vapors throughout a room or apartment.

The expulsion of the formic aldehyde from a solution is difficult and takes much time. Such is the case, for instance, where a solution of formic aldehyde is contained in a pan at the bottom of which a heating-flame is applied. By the plan herein described, however, large heating and evaporating surfaces are provided, and I have found by experience that the whole of the formic aldehyde, where a solution is employed, or the whole of the paraformaldehyde, where it is incorporated into the mass as a comminuted solid, may readily be vaporized in a short space of time.

The burner device or apparatus which I prefer to employ is one which experience has demonstrated to be satisfactory and efficient, and it is shown in the accompanying drawings, in which—

Figure 2:
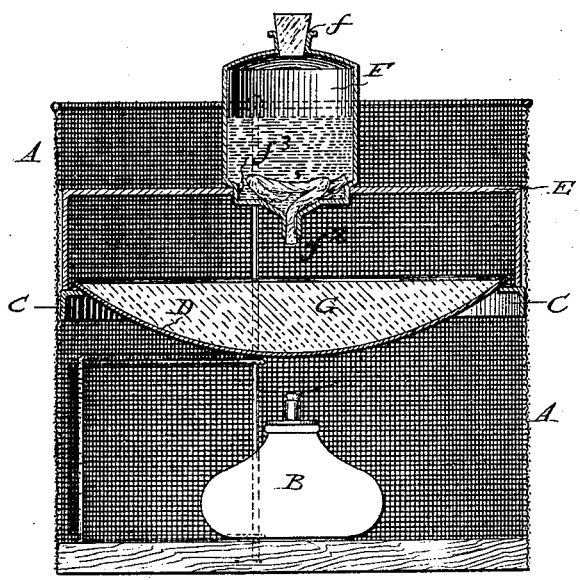

Figure 1 is a plan view, and Fig. 2 a vertical transverse sectional view.

The cage or casing A, which may be circular in horizontal section or of other contour, as may be desired, is shown as composed of wire-netting, which may or may not be strengthened by a skeleton frame upon which the wire-netting is placed. At the base of the casing there is an opening for the insertion and removal of a burner, which may be, as shown, an alcohol-lamp B. At a suitable point above the floor or bottom of the casing is an internal annular bracket or flange C to receive a removable pan D. At the top of the casing, above the pan, is a cross-bar E of a width to support a vessel F, which is provided with a filling-aperture $f$, that may be closed by an ordinary stopper and at its bottom has an aperture $f^2$, occupied by a wick lying partly within the vessel and partly pendent therefrom, with its lower end a suitable distance from the pan D. The lower part of the vessel may be formed with a hub $f^3$, passing through an opening in the cross-bar upon which the vessel is seated. In the pan is a plaster-of-paris block or a mass of refractory material, which is marked G and which has incorporated into it comminuted solid disinfecting or fumigating material capable of vaporization or which is saturated with a solution of such material. The vessel F contains either water or an aqueous solution of disinfecting or fumigating material, and this solution is delivered in regulated quantity by the wick $f^2$ upon the block or mass of material in the pan. The heat from the flame of the alcohol or other lamp B vaporizes the disinfecting material as well as the water, and the combined vapors, rising, spread throughout the room. The wire netting or gauze forming the wall of the casing A below the support of the pan D confines the flame of the lamp in the event of its being of sufficient magnitude to spread laterally all over and beyond the bottom of the pan. This feature is desirable where formaldehyde vapors are generated, as these vapors are under certain conditions inflammable.

Of course the structure of the apparatus may be varied in many ways while still retaining the function or mode of operation described. The wick $f^2$ may be asbestos or cotton wick, or a piece of corrugated wire serves the purpose.

I claim as my invention—

1. The process of generating and distributing fumigating-vapors which consists in incorporating the fumigating material into a mass of refractory material, heating this mass to effect vaporization of the fumigating material therein contained, and at the same time delivering upon the surface of the mass a small regulated quantity of a liquid, substantially as herein described.

2. The process of generating and distributing fumigating-vapors which consists in saturating a mass of refractory material with a solution of fumigating material, heating the mass to produce vaporization of the saturating solution and at the same time delivering upon the surface of the mass in a small regulated quantity an aqueous solution of fumigating material.

In testimony whereof I have hereunto subscribed my name.

CHARLES THOMAS KINGZETT.

Witnesses:
 WILLIAM HOLMES,
 ERNEST FRANK HAMMOND.